United States Patent [19]

Johnson

[11] 4,104,060

[45] Aug. 1, 1978

[54] SOLID-PHASE CONVERSION OF PARTICULATE METAL INTO CONTINUOUS STRIP

[76] Inventor: Herbert G. Johnson, 17 N. Drexel Ave., Havertown, Pa. 19083

[21] Appl. No.: 744,435

[22] Filed: Nov. 23, 1976

Related U.S. Application Data

[63] Continuation-in-part of Ser. No. 557,394, Mar. 11, 1975, abandoned.

[51] Int. Cl.$^2$ .............................. B22F 3/12; B22F 9/00
[52] U.S. Cl. .................................. 75/208 CS; 75/214; 75/224; 425/79
[58] Field of Search ................... 75/208 CS, 214, 224; 425/79

[56] References Cited

U.S. PATENT DOCUMENTS

| 3,158,474 | 11/1964 | Andersen et al. | 75/214 |
| 3,184,840 | 5/1965 | Byrne et al. | 75/214 |
| 3,512,964 | 5/1970 | Fuchsman | 75/214 X |
| 3,664,009 | 5/1972 | Huller et al. | 75/214 X |
| 3,708,284 | 1/1973 | Chao | 75/208 CS |

Primary Examiner—Richard E. Schafer
Attorney, Agent, or Firm—William R. Glisson

[57] ABSTRACT

This application discloses method and apparatus for solid-phase conversion of particulate metal (or swarf) into continuous metal-jacketed strip by feeding particulate metal, together with any desired reducing or alloying additives, between travelling metal jacket sheet components, the lower channel-shaped and the upper flat strip closely fitting between the channel sides; injecting air-purging reducing or inert gas to create an inside environment of protective gas rather higher than atmospheric air pressure, the gas entering the material and the embrassing jacket sheet components which after filling and closing form a permanent circumferentially and longitudinally complete jacket around the material; compacting the material in the jacket sheet components after closing by repeated compacting actions; feeding this strip forward between successive compacting actions while clear of the compacting die elements; sealing the jacket components closed together over the compacted material to form a circumferentially complete jacket; subjecting the compacted jacketed strip to a heating treatment to bring the particles and jacket to sintering and fusion-bonding temperature; returning hot gases (counterflow) to the particulate material being red in; hot-compacting the heated jacketed strip to reduce its thickness, coalesce and densify the material; and (when desired) cold-compacting the strip to improve physical properties; coil, or cut into finite lengths.

18 Claims, 5 Drawing Figures

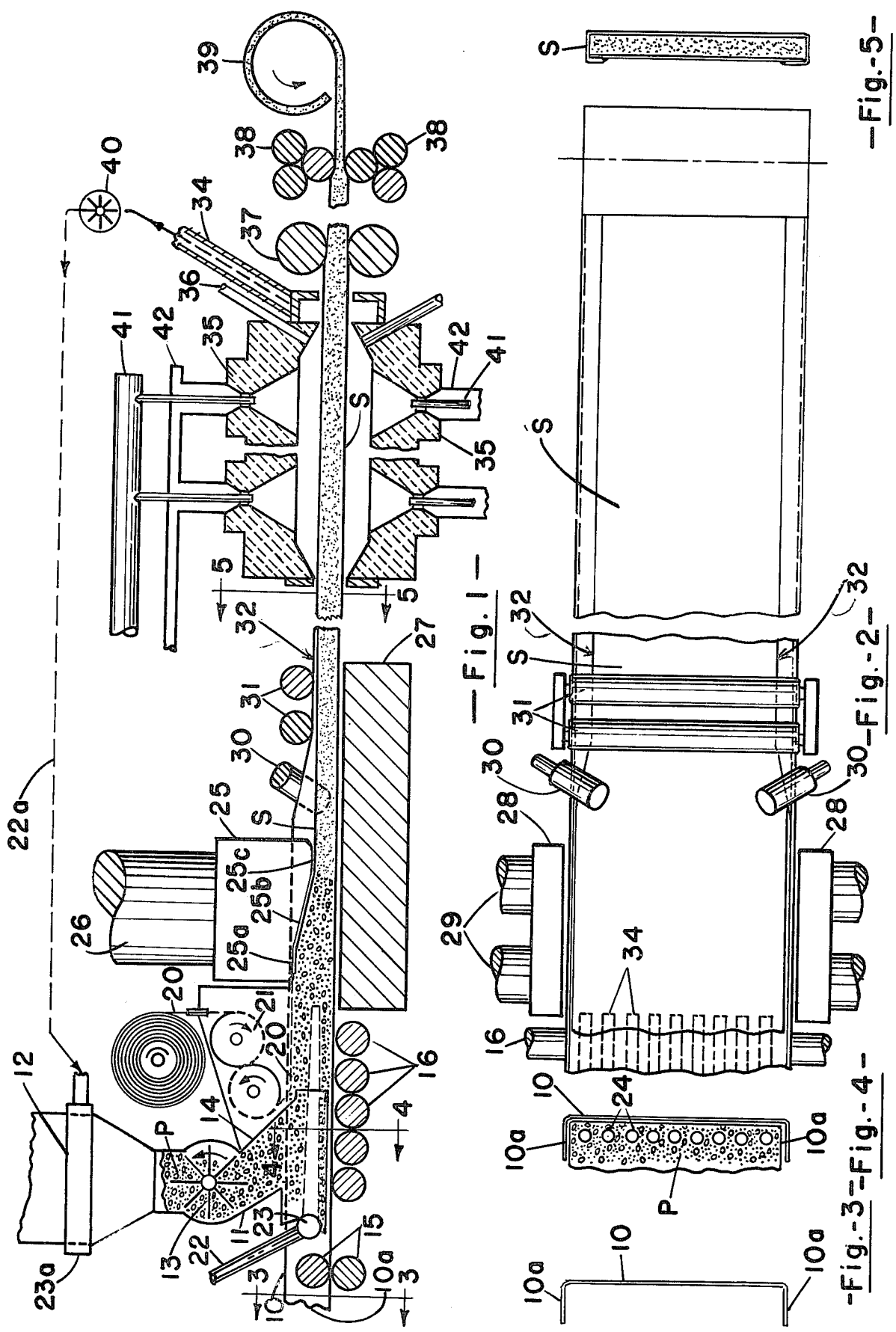

SOLID-PHASE CONVERSION OF PARTICULATE METAL INTO CONTINUOUS STRIP

This application is a continuation-in-part of my copending application, Ser. No. 557,394 filed Mar. 11, 1975, now abandoned.

Much work has been done in compressing particulate material, mostly for pieces or billets of finite length but some for continuous unjacketed strip. For example, note my U.S. Pat. No. 2,902,714, Sept. 8, 1959.

There have been some proposals to supply a carrier sheet for one side of a particulate-compacted strip to give it sufficient tensile strength to be handled but without forming a complete sealed circumferential jacket over the material.

There have also been some proposals for providing complete protective jackets for short lengths of compacted material.

There have been proposals for feeding particulate material into pre-formed carrier jacket tubes and then compacting the jacketed material and later disposing of the jacket component.

But, so far as is known, there have never been any proposals for feeding particulate metal between jacket components being assembled, effectively, continuously, and with economy of equipment and energy, compacting thick layers of jacketed metal at one stage with suitable super-atmospheric gas protection in the jacket, and subsequently, preferably continuously, treating the jacketed strip to coalesce the particles with deoxidation and-or alloying action and diffusion, bonding the coalesced core to the inner surface of the jacket as permanent components in a commercial product.

SYNOPSIS OF INVENTION

According to the present invention, a continuous sheathed or jacketed strip of compacted particulate metal is produced by feeding particulate metal, such as powder, grindings, turnings, fragmented metal pieces, metallic residues from municipal waste processing, and mixtures of such particles, together with a reducing and-or alloying additive, if desired, to advancing sheet jacket components which will form, after filling, a complete circumferential jacket over the strip, one jacket sheet component preferably being of channel shape, especially when the travel is horizontal, the channel-shaped component readily being formed by folding up the sides of a flat sheet fed from a roll; purging the material as fed to the jacket components before being closed together by a pressurized protective reducing or inert gas; feeding another jacket sheet component, as flat, from a roll to fully enclose the material with the other jacket component; compacting the particulate material while purged and pressure-gas protected by intermittently repetitively-acting longitudinally-extensive die means, say to 50 to 90 percent of its melt-metal density while inhibiting side spread, as by concurrently acting side die means which close and retract in phase with the compacting die means; and sealing the jacket sheet components together to form a circumferentially complete jacket enclosure to maintain protection for later treatment. Subsequently, and preferably as a continuous or contemporary action on the compacted jacketed strip advancing from the compacting means, subjecting the strip of metal particle core and metal jacket to a particle-fusing or coalescing and hot-compacting action, say to 90 or 100 percent solid density while gas-protected to bond the jacket to the core; and thereafter, if desired, subjecting the strip to a cold-compacting action which further reduces its thickness and improves its physical properties, the core and jacket being compatible metals and the composite jacket-core strip being used as a product.

For efficiency and economy, some or all of the protective gas from the heating furnace may be returned to the infeeding material to heat and protect it.

When the subsequent heating and compacting actions are performed on the compacted jacketed strip contemporaneously with the cold-compacting action, the roll-advancing action (when rolls are used) may be coordinated with the cold-compacting action to advance the strip at intervals when it is free from the cold-compacting means. When the subsequent rolls do not advance the strip, as when the subsequent rolling action occurs non-contemporaneously or separately from the cold-compacting action, or when there is a movement-compensating loop in the strip between the cold-compacting means and the subsequent rolls, the strip may be advanced in incremental timed steps to the cold-compacting means by various means, such as a plunger, moving belt, power rolls, or the like, acting on the composite strip or on the jacket sheet components.

By compacting the material by longitudinally extensive successively-acting repetitive transversely advancing and receding means, such as ram or hammer dies, the side spread of the strip is minimized, each unit of length is repeatedly compacted the purging action of the protective gas is more complete, and other advantages are obtained. By acting on and through the jacket components the fouling and abrasion of the ram dies is minimized. When the subsequent heating and compacting actions are contemperaneous with the cold-compacting action the unpurged harmful components, if any, are further eliminated and the action of the protective gas, such as has moved forward when the compacting means are separated, is better utilized and the deoxidizing and alloying actions are facilitated.

DRAWINGS

The objects of the invention, as well as various features of novelty and advantages, will be apparent from the following description of an exemplary embodiment thereof, reference being made to the accompanying drawings, wherein:

FIG. 1 is a side elevational and sectional view of apparatus embodying the invention;

FIG. 2 is a corresponding plan view of the apparatus shown in FIG. 1;

FIG. 3 is a partial vertical transverse section taken on the line 3—3 of FIG. 1, showing the lower jacket sheet component;

FIG. 4 is a partial vertical transverse section taken on the line 4—4 of FIG. 1, showing the gas-injection and pressure-retaining means;

FIG. 5 is a partial vertical transverse section taken on the line 5—5 of FIG. 1, showing the sealing of the jacket components.

SPECIFIC EMBODIMENT

The particular material considered herein for treatment comprises a supply of suitably cleaned and possibly somewhat oxidized machine turnings, mill borings, milling machine chips, scarfing grit or mill scale, generally referred to as swarf, especially carbon and alloy steels, of known and segregated chemical character as produced from the same or homogeneous grade of parent metal. The jacket cover sheets are composed of a metal of the same character as the particulate material or compatible with it. The cover or jacket material may even be of a character to resist oxidation more effectively than the particulate material, as stainless steel for jacketing carbon or alloy steel. The particulate material may, if desired, have mixed with it or the jacketed enclosure may contain a substance, such as carbon (graphite form or the like), carbon-monoxide, hydrogen, or the like, which will have a reducing action when the compacted jacketed strip is heated. Also, if desired, the particulate material may have mixed with it an alloying additive, such as manganese, cobalt, tungsten, silicon, chromium, nickel, molybdenum, titanium, vanadium, and the like (for steel) to change the composition and properties of the product when heated to effect the alloying, fusing and deoxidizing action.

As herein shown, a pre-formed lower or first jacket sheet component 10 is fed forward at a controlled intermittent rate beneath a feed tube or chute 11 which supplies particulate material from a source of supply, such as a silo or hopper 12, the rate of feed of material being controlled by a feeding device 13 of any suitable type and the material being spread in an even depth across the lower jacket sheet 10 by spreader means 14 associated with the lower end of the feed tube. The space around the deposited material is enclosed and gas-pressured to seal out air. The deoxidizing and-or alloying additives, referred to, will be mixed with the particulate material before introducing it into the hopper.

The lower jacket sheet 10, especially when travelling horizontally, as shown, is preferably of channel shape with sides 10a of sufficient width to be folded over the material after it has been compacted. This channel-shaped carrier jacket component of element may be formed from a roll of flat sheet material which is folded up on the sides by devices of known type as it enters the forming zone. This can be readily understood without illustration.

The channel-shaped carrier jacket sheet 10 is supported beneath the feed position by any suitable means, such for example as rolls 15, which may be live rolls and may have upper gripping rolls within the sheet channel cooperating with them, if desired, to feed or aid in feeding the jacket sheet. An endless loop belt carrier could be used over the base supports.

Beyond the material feeding position a jacket cover sheet 20 is fed down and fitted closely over the material in the channel-shaped carrier sheet 10. It is fed at the same rate as the carrier sheet 10 by any suitable means, such as the feed rolls 21.

Means are provided for purging air from the particulate material and pressurizing the feed chamber with a protective gas, the means here shown comprising a gas feed pipe 22, a transverse manifold 23 located ahead of the feed position, and a plurality of feed tubes 24 which inject a protective and preferably reducing gas under pressure to a position just in front of the compacting means, as here shown appreciably beyond the point where the cover sheet engages the top of the material on the carrier sheet. With this arrangement the jacket sheets aid in forming a sealing enclosure to hold the gas under positive pressure in the particulate material and aid in directing it into the the material being acted on by the compacting means. The tubes 24 are sealed where they enter the enclosed chamber and the jacket sheet components are sealed where they enter the enclosure.

The tubes 24 are tapered to facilitate the passage of material along them. The injected gas may include, but is not limited to, helium, argon, nitrogen, carbon-monoxide, cracked propane, ammonia, and the like.

Means are provided for compacting the particulate material in the jacket component sheets, the means here shown comprising a hammer punch or die 25 carried by a ram 26 acting against a long anvil plate 27 over which the composite strip of material and its jacket sheets, referred to as a whole by the letter S, is passing in forward increments coordinated with the actions of the compacting means.

Means are provided for facilitating the movement of the composite sheet S to avoid side binding and to restrict side spread, the means here shown comprising side punches or dies 28 operated by rams 29 in timed relationship with the action of the compacting punch or die. That is, the side dies will move in and out simultaneously as the compacting die moves in and out. The side dies merely retain the initial width of the strip with its carrier sheets without moving in far enough to reduce the width.

It will be noted that the compacting die 25 is quite extensive longitudinally and that it has a leading flat portion 25a, a tapered intermediate portion 25b, and a trailing flat portion 25c. The compacting die will have a plurality of successive actions on any given increment of length of the strip, acting first at its leading flat portion 25a, then at the tapered intermediate portion 25b, and finally at its trailing flat portion 25c.

A compacting die acting transversely of the strip has less tendency than other compacting means to spread material laterally; it permits the use of side-engaging-and-releasing spread-restricting dies; and it gives repeated compacting actions on any given length increment of strip. It also assists in forcing out of the particulate material any retained air by rearward squeezing action; and it provides intervals of opening to permit forward feed of the strip and allows purging gas to move forward into the compacted strip material, which has some open spaces, so the gas can have further purifying action when the composite strip is later heated.

As here shown, the cover sheet 20 is fed in ahead of the compacting position, and here it aids, as stated, with its incoming seal, in enclosing the protective gas in the jacketed strip, especially after the strip leaves the pressure chamber. If the gas is of such a nature, as high in carbon-monoxide for instance, that it needs to be more closely confined, a completely tight enclosure may be provided over the entire compacting zone, as in my patent referred to above. When the cover sheet is fed in ahead of the compacting means an advantage is obtained in that the successive repetitive incremental large-area compaction action is such as to minimize possible damage to the cover sheet and best preserve its integrity as a sealing jacket component. Also the cover sheet avoids contact of the compacting tools with the material and thus minimizes fouling and abrasion of the tools by the compacting action.

Means are provided for sealing the compacted material in the jacket, the means here shown comprising side inclined rolls 30 which bend the upper portions of the sides 10a of the carrier sheet over at an angle and horizontal pressing rolls 31 which squeeze the bent sides down flat over the cover sheet 20.

For some materials and purposes this folded enclosure may be adequate as a seal but some materials and purposes may require a more secure and complete seal.

For providing this the folded sides may be fusion sealed to the cover sheet, as by "MIG" (metal-inert-gas) seam welding means 32, such as is regularly used in industry for making continuous seam welds automatically. This will be understood merely from a showing of the electrodes.

After the compacting and sealing operations have been performed on the strip it may be taken off for further use, as by winding into rolls or cutting to desired lengths, the ends being closed and sealed to avoid contamination until used. Incidentally, the forward end of the strip is preferably sealed at the start of operations and the trailing end is sealed when the length is completed.

Or, with considerable advantages, the strip may be further treated while travelling from the compacting and sealing means. As shown, the sealed composite strip is passed to a heating furnace 35, a loop being left for travel adjustment, if desired. The breaks or discontinuities shown in the drawings denote the locations of possible slack loops when desired.

Means, such as pipes 36, are provided for introducing a suitable gas into the furnace to protect the exterior of the strip. The furnace is heated by fuel gas and air supplied by pipes 41 and 42. Hot gases from the furnace may be collected and fed back through pipe means 34, compressed at unit 40, and returned by pipe 22a to a manifold 23a at the feed hopper 12 to preheat and deaerate the particulate material as fed in, thus considerably reducing gas and energy consumption and making the material more workable.

As stated, it may be desirable to use a material, solid or gas, with the particulate material to provide a deoxidizing or other purifying action on it in the jacket, or to add an alloying ingredient. In such case the heating will be adequate to assist this purifying and-or alloying action to the desired extent. The furnace and the returned hot gases supply this need.

After heating in the furnace, the hot strip is hot-compacted, as by rolls 37, to further reduce its thickness and fuse the particles which have been brought to a coalescing temperature in the furnace. As an alternative to using rolls, the hot compaction may be performed by die or hammer action similar to that for the initial cold compaction.

Subsequently the strip may be further compacted and reduced in thickness and the jacket surface improved, as by passing it through the cold-rolling rolls 38.

Finally, the strip may be coiled into a roll 39 for subsequent use, the ends being sealed, as mentioned. Or, as also mentioned the strip could be cut into finite lengths and the ends sealed until used.

The outer surface may be protected by known means prior to use. Also, as stated, the jacket material may be of a nature to inhibit contamination of its surface or have an interior coating which will react to assist in purifying or alloying with the interior particulate material when heated.

By virtue of the continuous counter-flow fluid-like action between the advancing particulate material (with possible entrapped gases) against the strong backflow of hot gas from the compacting, densification, sintering and chemical actions which cause progressive gas pressure and temperature intensification, the particulate material is progressively stripped of all harmful gases, such as oxygen, prior to compaction, No air can infiltrate the jacket, even when not sealed, because any leakage must be outward rather than inward, since inside gas pressure is higher than outside at all times.

Also, since all outgassing from the compacted particulate material during its sintering treatment and subsequent densification is at high temperature, the backflow of gases also preheats the porous compact progressively as the strip approaches the sintering furnace, and the gases continue to give up their heat to the particulate material as they flow back through the advancing mass to escape through the feed chute. This has the consequential desirable effect of reducing the power required for compaction, since most common metals soften and weaken with increase in temperature, threeby reducing the force required for their deformation.

Although originally intended for low-investment low-cost steel production from the cheapest forms of scrap, this concept of continuous counter-flow purging under positive inert gas back-pressure inside the protective jacket — when the furnace is used in line — has proved to be even better adapted than vacuum as an environment for processing high-cost particulate matals on a continuous basis.

The practical impossibility of maintaining zero-leakage high-vacuum seals, while continuously incharging particulate material and discharging strip, creates air inflow problems which are difficult to deal with.

While one embodiment of the invention has been described for purposes of illustration, it will be understood that there may be other embodiments and modifications within the scope of the invention.

I claim:

1. The method of converting particulate metal into continuous strip without melting, which comprises, feeding into a feeding enclosure a plurality of sheet metal jacket components which together will form a complete jacket around a core of metal particles, feeding particulate metal to form a core between the advancing jacket components, feeding a protective gas under pressure between the jacket components and into the particulate metal to purge the air from said particulate metal and from said feeding enclosure, bringing the jacket components together to form a complete gas-retaining jacket over the core of particulate material, and compacting the composite strip of core and jacket while still filled with protective gas under pressure, with some of the gas in the composite strip being forced back by the compacting action toward the feeding enclosure.

2. The method as set forth in claim 1, wherein the compacting action is intermittent to allow gas flow in the jacketed material at times while the compacting pressure is relieved.

3. The method as set forth in claim 1, wherein a first jacket component is channel-shaped and a closing jacket component is a flat sheet fitting closely in the channel-shaped component over the particulate material therein, and wherein the compacting action is applied upon the closing sheet within the channel-shaped component after the jacket components are closed over the core of particulate material.

4. The method as set forth in claim 3, wherein, after the compacting action, the sides of the channel-shaped jacket component are brought over and down on the flat jacket component.

5. The method as set forth in claim 4, wherein the jacket sheet components are joined together in continuous seamed relationship after the compacting action and while the interior of the jacketed strip is still in communication with the protective gas under pressure in the feeding enclosure.

6. The method as set forth in claim 1, which further comprises, heating the sealed jacketed strip to a temperature sufficient to fuse the particles together and to the jacket after the compacting action and while the interior of the jacketed strip is still is communication with the protective gas under pressure in the feeding enclosure.

7. The method as set forth in claim 6, in which the sealed jacketed strip is further compacted after heating and while still in communication with the protective gas under pressure in the feeding enclosure.

8. The method as set forth in claim 2, in which a rapping action is given to the sides of the strip concurrently with the intermittent compacting action to avoid side spread and assist in the forward feeding movement of the strip.

9. The method as set forth in claim 6, wherein an additive is supplied to the in-fed particulate material which will react with the material at the temperature to which it is heated, the interior of the sealed jacketed strip being in communication with the feeding enclosure so that any gases which are produced in the heating action can flow back toward the feeding chamber.

10. The method as set forth in claim 6, wherein at least some of the hot gases of the heating action are fed back to the infeeding material by a route external to the jacketed strip to heat the material before being fed.

11. The method as set forth in claim 3, wherein the channel-shaped jacket component is sealingly fed in in a generally horizontal disposition into the feeding enclosure, the material fed into the open channel-shaped component, and the flat sheet component sealingly brought in and down over the material within the sides of the channel-shaped component.

12. Apparatus for continuously converting particulate metal material into strip of indefinite length without melting, comprising in combination, means for sealingly feeding to a feeding enclosure filled with protective gas under pressure a plurality of metal jacket sheet components which together form a longitudinally and circumferentially complete jacket around the metal core of the strip, means for sealingly feeding particulate metal material between the jacket components in the feeding enclosure, the jacket sheet components as fed in forming a complete enclosure over a core of material, means for injecting air-purging protective gas into the particulate metal, and means for compacting the jacketed strip as it moves along after the jacket components have been closed over the core material and while the interior of the jacketed strip is still in communication with the protective gas within the feeding enclosure.

13. Apparatus as set forth in claim 12, wherein said compacting means comprises means for intermittently delivering repetitive side-directed hammering blows to the jacketed strip, leaving the strip free of compression between actions to allow passage of gas interiorly along the enclosed strip between compressing actions.

14. Apparatus as set forth in claim 12 wherein one jacket sheet component is channel-shaped and a closing jacket sheet component is a flat sheet fitting closely within the sides of the channel-shaped component, wherein the compressing means forces said closing sheet component down over a core of material in said channel-shaped component, and which further comprises means for folding the sides of the channel-shaped component inwardly over and down on the top of the closing sheet component covering the compacted core material.

15. Apparatus as set forth in claim 14, which further includes means for forming continuous seam welds between the folded-down side portions of the channel-shaped jacket component and the closing sheet component.

16. Apparatus as set forth in claim 12, which further comprises means for heating the closed jacketed strip to a sintering temperature while the interior of the jacketed strip is still in communication with the protective pressure gas in the feeding enclosure.

17. Apparatus as set forth in claim 16, which further includes means for compacting the heated closed jacketed strip while the interior of the jacketed strip is still in communication with the protective pressure gas in the feeding enclosure.

18. The apparatus as set forth in claim 16, which further comprises, means for returning heated gases from the heating means to the infeeding material externally of the space in the jacketed strip.

* * * * *